G. H. DAVIS.
PERFORATED MUSIC SHEET FOR AUTOMATIC MUSICAL INSTRUMENTS.
APPLICATION FILED NOV. 21, 1916.
1,353,460.  Patented Sept. 21, 1920.
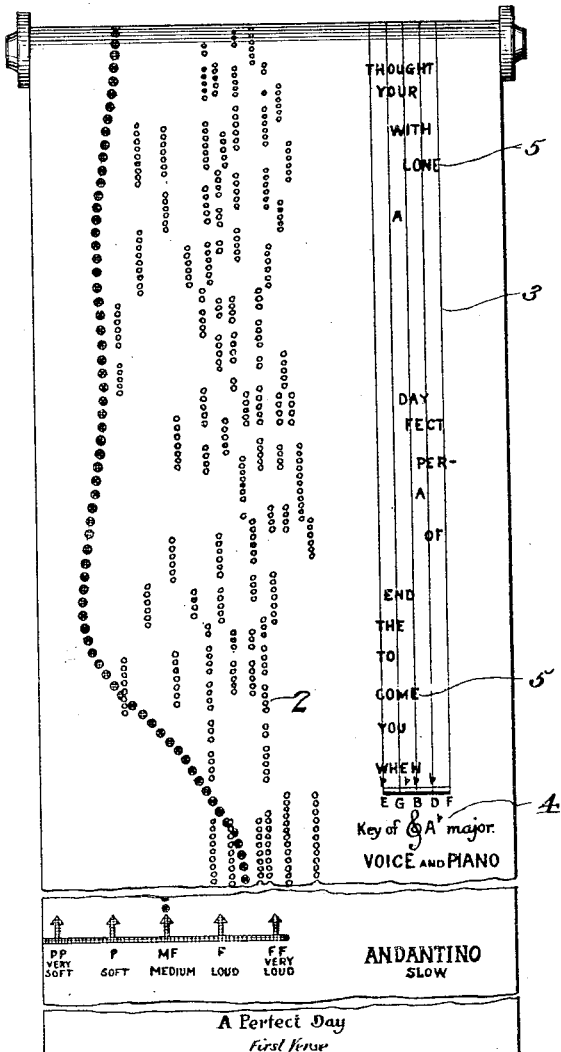
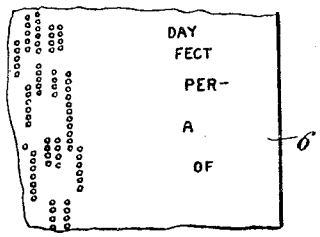

UNITED STATES PATENT OFFICE.

GEORGE HOWLETT DAVIS, OF WEST ORANGE, NEW JERSEY.

PERFORATED MUSIC-SHEET FOR AUTOMATIC MUSICAL INSTRUMENTS.

1,353,460. Specification of Letters Patent. Patented Sept. 21, 1920.

Application filed November 21, 1916. Serial No. 132,537.

*To all whom it may concern:*

Be it known that I, GEORGE HOWLETT DAVIS, a citizen of the United States, residing at West Orange, in the county of Essex and State of New Jersey, have invented certain new and useful Improvements in Perforated Music-Sheets for Automatic Musical Instruments, of which the following is a specification.

The present invention relates to music record sheets such as are commonly wound on rolls and used in conjunction with self-playing musical instruments for controlling the operating mechanism of the latter.

As is well known, a music sheet of this character is provided with spaced perforations which are adapted to register with orifices in the tracker device of the instrument to control the playing of the latter, these perforations being made according to a predetermined scale and of various lengths to accurately reproduce a musical composition as to pitch, tone, melody and other related factors. In addition to these perforations, such a sheet is generally provided with a continuous, irregular dotted line by which the expression of the piece being played is governed, and accompanying letters, such as PP; P; MF; F; FF; are usually applied to indicate that certain parts of the composition are to be played "very soft"; "soft"; "medium"; "loud"; and "very loud," respectively; these marks of expression of course being for the purpose of assisting the player to interpret the composition.

At the present time there is marketed a vast number of these music rolls which embody, or are intended for performance of, musical compositions which in addition to the musical score also contain the words of a song, and especially so is this the case with many of the so-called "popular songs" of the present day. The perforated sheet, however, of itself only permits the playing of the musical score, or the notes of the composition, no means being provided, so far as I am aware, to enable the performer or other person to sing the song to the accompaniment of the music in such a manner as to accurately render the song words in correspondence with the notes, as to pitch and tone. I know that it has been proposed to apply to the music sheet the words of the song, printed in the form of ordinary versification, and in some instances the words have been printed lengthwise of the sheet in conjunction with an additional scale of tones, or indicia or characters representing such tones which must be read by the singer in connection with the words much after the manner an ordinary sheet of music is read. It will be readily appreciated that the performer must be thoroughly familiar with the tone or melody to sing the words when printed in the form of ordinary versification, or must be capable of reading the marks or similar indicia, when the latter are used in conjunction with the words, to give a proper rendition of the composition.

As contradistinguished from these methods of applying the words of the song to the sheet, it is my purpose to print the words of a song upon the sheet lengthwise thereof, and at points corresponding to the perforations or notes, in such manner that the arrangement of the words themselves relative to each other will indicate the pitch, tone and melody, thereby enabling the singer to determine at a glance whether a specific word or portion of a word should be sung high or low, for instance, and thus insuring that such word will be given its proper pitch and tone in the rendition of the song.

It is also my purpose to provide a music sheet of this character wherein the above recited arrangement of the words may be employed either with or without the usual lines of the musical scale as the relative positions of the words themselves will be sufficiently indicative of the pitch and tone values to be given to such words during the singing of the song.

Furthermore, at or adjacent one end of the roll I may print the words of the song in versified form so that at the start of the performance, or preliminary thereto, these verses will serve to acquaint or familiarize the person with the words of the song thus rendering it a comparatively easy matter to recall the words and their sequence during the travel of the roll while the instrument is being played and the song being sung.

In the accompanying drawings,

Figure 1 is a face view of a portion of a music sheet made in conformity with my invention.

Fig. 2 is a similar view showing the arrangement of words without the employment of the musical scale or the staff or key characters.

Referring now to the accompanying drawings in detail and in particular to Fig. 1 thereof the numeral 1 indicates a portion of a music record sheet intended to be used in connection with an automatic musical instrument, this sheet being provided with the usual perforations 2 which are intended to register with the orifices in the tracker to control the playing of the instrument, as will be readily understood.

In order to more clearly understand my invention, we will assume that the perforations in the music sheet are such as to make a record of the music or score of the composition entitled "A Perfect Day," certain words or phrases of this composition being also used to illustrate the invention.

In the manufacture of the music roll shown in Fig. 1, I print the five lines for the ordinary musical scale, as shown at 3, these lines extending lengthwise of the sheet and preferably adjacent one edge thereof, the scale or staff being provided with the usual key indicating characters shown at 4. The words of the song I print in a longitudinal row on or relative to this scale, the individual printed words or parts thereof extending transversely to the lines of the scale. The words, which are shown at 5, of course correspond in their positioning with regard to the scale, to the tone to be sung and also are positioned in approximately transverse alinement with predetermined perforations of the musical score so that when a particular passage of the score is being played, the words which are applicable to or correspond to such passage in the musical composition being rendered will be brought within the range of vision of the singer properly positioned on the scale so as to indicate to such singer the nature of the pitch or tone to be imparted to the words. Or, to state the matter otherwise, the song words are arranged longitudinally of the sheet and are positioned relative to one another and to the note perforations in such way as to indicate by their positions distinguishable tone values corresponding to the musical sounds represented by particular perforations whereby a singer may interpret the musical score represented by the note perforations from the position of the song words. Thus, it will be seen that instead of arranging the words in a straight column or row extending longitudinally of the sheet they have the staggered appearance found in the ordinary printed musical score due to the different positions which the notes occupy on the scale.

At or adjacent the outer end of the sheet or roll I preferably print the words of the song in their usual versified form, as shown at 6, so that preliminary to the rendition of the song a person may read over these verses and thus in a measure acquaint or familiarize himself with the words and their sequence or arrangement, so that while the instrument is being played, and the words arranged in roll-like form, as shown at 5, are brought within the vision of the person, it will be a comparatively easy matter to recall the words and their relative order, thus insuring a smooth rendering of the piece that will naturally follow from thorough acquaintance with the words thereof.

In Fig. 2 I dispense with the lines of the scale in the key markings thereof, the words on the music sheet in this case which are indicated at 6 indicating by their relative positions the pitch or tone to be imparted or given thereto.

It will thus be observed that when my record music sheet is being used in connection with a self-playing musical instrument, as the music sheet passes the line of vision of the performer, not only will a particular passage be played, but simultaneously with the playing of such passage the particular words applicable thereto will be exposed to view so that they may be read by the singer and at the same time the position of the word will indicate to the singer the tone or pitch to be given, thus securing the proper interpretation or singing of the song.

It will be apparent that I have so arranged the perforations and the successive syllables or words that each has its separate zone, the words being entirely clear of and free from the perforations, avoiding the difficulty in reading the words from a rapidly moving sheet when perforations are located adjacent the words. At the same time, the arrangement of the syllables or words transversely to the sheet is such that the pitch at which each syllable is to be sung is indicated by its position. This arrangement is superior to one in which the pitch of each syllable is indicated by its juxtaposition to the perforation which produces the corresponding note on the instrument, as such perforations are ordinarily spaced transversely across the sheet by distances considerably greater than those which are necessary when the transverse spacing of the syllables is independent of the perforations. Furthermore, when syllables are located adjacent such perforations, notes which are to be completed by the instrument at the same time, and having a higher pitch, require perforations which must be so located that they will be interspersed with the words and must necessarily cause confusion and delay in reading the latter.

It will, furthermore, be evident that the first letter of each syllable, word or group of words located on the same transverse line and ordinarily intended to be sung at the same pitch, is the element which indicates said pitch; and as the eye in reading successive syllables naturally skips from the end of one to the first letter of the next, the relative position of each successive syllable is inevitably apparent in the course of ordinary reading, providing a guide as to pitch without necessitating any attention to pitch-indicating factors substantially spaced from the words. This is facilitated when the lines of the staff are actually printed on the sheet, as the eye in reading successive syllables will grasp the position of the first letter relative to the staff in the same way that the eye grasps the location and length of notes in reading ordinary music.

What I claim is:

1. A song roll for automatic musical instruments including a sheet having note perforations therein adapted to control the instrumental rendition, and syllables forming song words arranged in succession in a zone extending longitudinally of the sheet and spaced from the perforations, the successively arranged syllables having their initial letters located at different distances from the sides of the zone in accordance with the pitch at which the syllables are to be rendered, those having a high pitch being located near one side of the zone, those having a low pitch near the other side thereof and those having intermediate pitches being located at such distances from the high and low pitch positions as to indicate their relative respective pitches, the construction being such that the singer is guided in pitch by the location of the initial letters of successive syllables transversely in the zone.

2. A song roll for automatic musical instruments of the type which comprises a relatively long sheet passed lengthwise over the instrument actuating mechanism, including perforations in said sheet controlling the instrumental rendition of a song selection, and syllables forming the song words arranged in successive lines transverse to the sheet in a zone running lengthwise of the sheet and spaced from the perforations, each syllable being located in substantially the same relation to its complemental perforations, so as to aid synchronous rendition of the words and the instrumental accompaniment, a staff with its lines running lengthwise of the sheet and located in said zone, each of the successively arranged syllables having its initial letter located in the same position relative to said staff that a note indicating the pitch at which the syllable is to be sung, would occupy, the construction being such that the singer is guided in tempo by the successive approach of the syllables on the moving sheet to a fixed point, and is also guided as to the pitch at which said syllables are to be sung by the position of the initial letters thereof relative to said staff.

In testimony whereof I affix my signature in the presence of two witnesses.

GEORGE HOWLETT DAVIS.

Witnesses:
H. L. DIKEMAN,
N. J. DURR.